US006139220A

United States Patent [19]

Angel et al.

[11] Patent Number: 6,139,220

[45] Date of Patent: Oct. 31, 2000

[54] PLACEMENT DEVICE FOR UNDERWATER MATS

[76] Inventors: Thomas M. Angel, 25 Mary Hughes Ct., Houma, La. 70363; Robbie Boudreaux, 924 Hwy. 55, Montegut, La. 70377

[21] Appl. No.: 09/440,402

[22] Filed: Nov. 15, 1999

Related U.S. Application Data

[63] Continuation of application No. 08/975,418, Nov. 20, 1997.

[51] Int. Cl.[7] .......... F02B 3/12

[52] U.S. Cl. .......... 405/17

[58] Field of Search .......... 405/15, 16, 17, 405/18, 19, 20

[56] References Cited

U.S. PATENT DOCUMENTS

| | | | |
|---|---|---|---|
| 1,619,331 | 3/1927 | Chenowth | 405/17 |
| 4,486,120 | 12/1984 | Landry, Jr. | 405/17 |
| 4,906,130 | 3/1990 | Manley, Jr. et al. | 405/17 |

*Primary Examiner*—Eileen D. Lillis
*Assistant Examiner*—Frederick Lagman
*Attorney, Agent, or Firm*—Jackson Walker LLP; Mark H. Miller

[57] ABSTRACT

A mat support system is disclosed, wherein there is included a series of straps supporting a mat, wherein the straps are quickly releasable from a position where the mats are supported to a position where the mat is released. The quick release mechanism substantially simultaneously releases all supports for the mats. A safety lock is includes to prevent inadvertent operation of the quick release mechanism.

5 Claims, 9 Drawing Sheets

PLACEMENT DEVICE FOR UNDERWATER MATS

CROSS REFERENCES TO RELATED APPLICATIONS

This application is a continuation application of application Ser. No. 08/975,418, filed Nov. 20, 1997.

FIELD OF THE INVENTION

The present invention relates to a frame for setting large devices underwater, in particular, subsea mats. More particularly, the present invention relates to the system for placing mats that stabilize and protect undewater pipes and other seabed installations in water, which can be shallow or over 2500 feet deep.

BACKGROUND OF THE INVENTION

Articulated mats are used for offshore coastal and marine applications where separation, stabilization, protection and scour prevention is needed for pipelines and other underwater installations. These mats are particularly useful in areas where considerable hydrodynamic forces are generated by bottom currents and waves. Thus, for example, a seabed pipeline can be covered with such a mat so that the pipeline is stabilized by the weight of the mat. Another benefit of the mat is its ability to prevent erosion of the adjoining seabed. Examples of articulated mats, their components, and their uses are given in European patent specification 0152232, and U.S. Pat. Nos. 2,876,628; 2,674,856; 4,370,075; 4,357,928; 4,417,828; 5,052,859; and 5,193,937.

A problem with use of mats is the placement of the mats on the seabed pipeline to be protected. Prior art handling and deployment frames require diver intervention and are difficult to obtain accurate placement. Prior art devices have required the use of multiple releasing aligning guides, which tangle in subsea usage. Multiple shackles or operating hydraulic valve controls prior to the mat being properly deployed have been created, but these result in the slow release of the mat on the seabed floor and expensive procedures and may involve pollution of the environment.

There is, therefore, a need in the art for a seabed mat placement system that can be easily released with low force applied to the release mechanism to activate it. There is also a need in the art for subsea mat placement systems that do not have a potential for environment pollution, such as by leaving parts, such as ropes on the seabed floor. There is a further need for a seabed mat placement system that can be quickly released and will accurately place the mat in deep water with high accuracy.

SUMMARY OF THE INVENTION

To effect a quick release, environment friendly, low force, accurately placing may release system, the present invention provides a handling frame system to place and release components, such as concrete mats. The frame system includes a frame with a series of supports for supporting the mat. The supports includes suspenders, such as webbed straps for supporting the mat, the suspenders having loops on at least one end for engaging the frame, and each suspender individually engaging a pin connector. The pin connectors are adapted to engage the loops of the suspenders and to fit into receptacles in the frame and be eligible for quick release. The receptacles hold the pin connectors. The pin connectors are also connected to reciprocating locks slidably mounted on the frames such that in a first position, the pin connectors are inserted into the receptacles and support the loops of the suspenders and in a second position, the reciprocating locks hold the pin connectors in a position where the loops slide off the pin connectors, releasing the mat. A release mechanism is also provided which has a central member attached to all of the reciprocating locks and supported by roller pins, which central member reciprocates along the frame and is connected to a handle. The handle is pivotably pinned to the frame and connected to the central member. The handle has a first position wherein the reciprocating locks are positioned to have the pin connectors in the receptacles in the frame holding one end of the suspenders and a second position wherein the reciprocating locks cause the pin connectors to disengage the receptacles in the frame, releasing the previously affixed end of the suspenders. A safety latch is also rotatably mounted on the frame and on the central member having a first position for blocking reciprocation of the central member and a second position permitting reciprocation of the second member.

In order that the invention can be more fully understood, various embodiments thereof will now be described, by ways of example only, with reference to the accompanying drawings.

BRIEF DESCRIPTION OF THE DRAWINGS

For a further understanding of the nature and objects of the present invention, reference should be had to the following detailed description taken in conjunction with the following drawings in which like parts are given like reference numerals and wherein.

DETAILED DESCRIPTION OF THE PREFERRED EMBODIMENT

Figure 1:
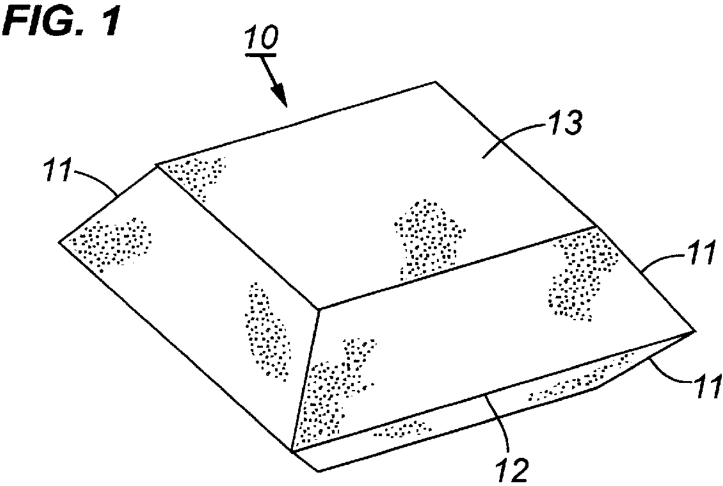
FIG. 1 is a perspective view of a single concrete element of the preferred mat used with the present invention.
Figure 2:
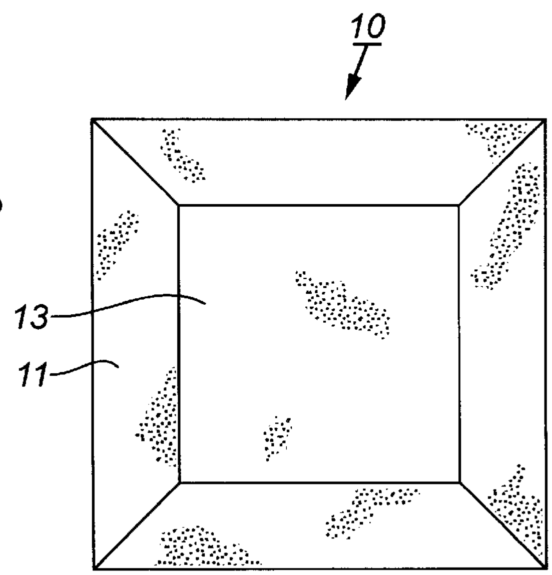
FIG. 2 is a top view of a single concrete element of the preferred may used with the present invention.
Figure 3:
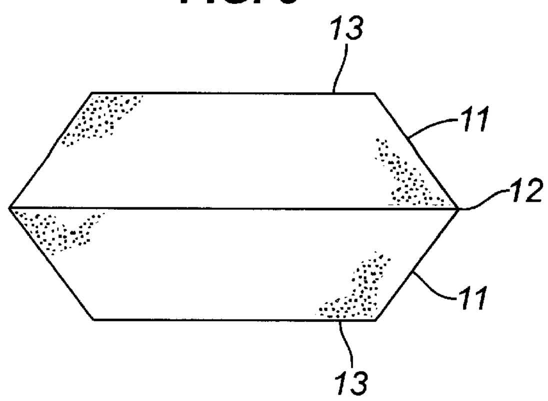
FIG. 3 is a side view of a single concrete element of the preferred mat used with the present invention.

The primary purpose of the present invention is to quickly and accurately place subsea mats, whether mats of the prior art or new mats. The present invention can be used to place other materials, other than mats in subsea use or use with helicopters, where quick and accurate deployment is required of a large surface area device. For purposes of the preferred embodiment, a new type of concrete element mat will be shown as the preferred mat 100 to be placed by the frame system 101. However, such mats 100 should not be considered restrictive of the present invention, but merely illustrative of the type of mats that can be placed by the present invention:

The primary component of the mat 100 is a concrete element. Although there are a number of suitable shapes in the prior art, the preferred embodiment of the mat is shown in FIG. 1. The best shape for the concrete element 10 is two symmetrically opposed pyramids 11. The common rectangular base of the two opposing pyramids 11 form the center 12 of the concrete element 10. Each of the pyramids 11 is truncated at its top to form a face 13 as shown in FIGS. 1–3.

Figure 7:
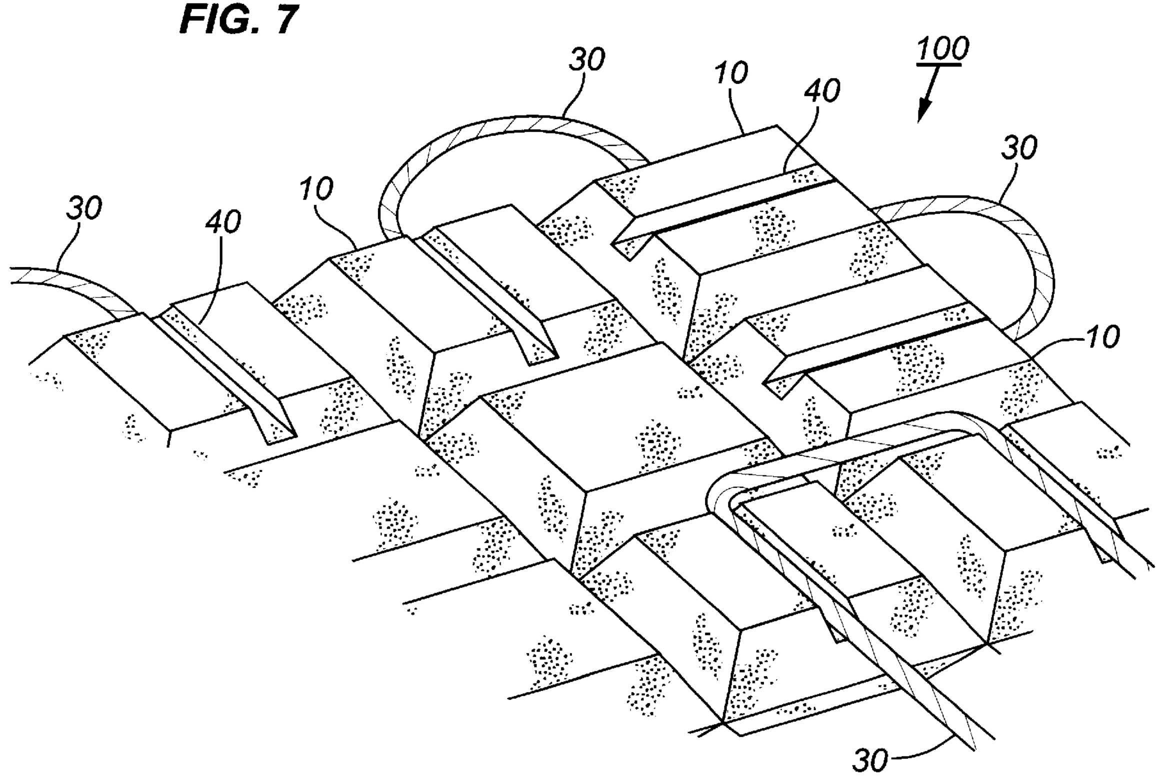
FIG. 7 is a perspective view of a comer portion of the subsea mat of the preferred mat used with the present invention.

To make a useful subsea mat 100, the concrete elements 10 are arranged in a row, column array as shown in FIG. 7. A flexible rope 20 is used to attach the concrete elements 10 to one another. The rope can be made of a polymer or copolymer materials or be biodegradable. In the preferred embodiment the rope should be capable of withstanding at least 8500 psi without breaking and capable of being embedded in the concrete while forming the mats.

Figure 4:
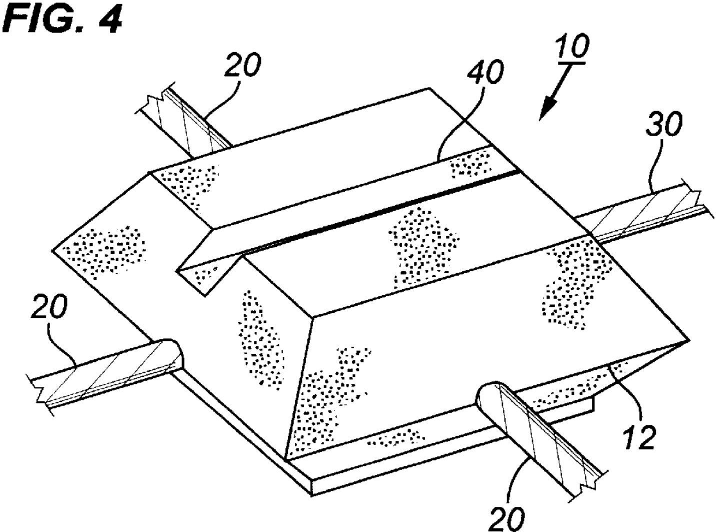
FIG. 4 is a perspective view of a single concrete edge element of the preferred mat used with the present invention.
Figure 5:
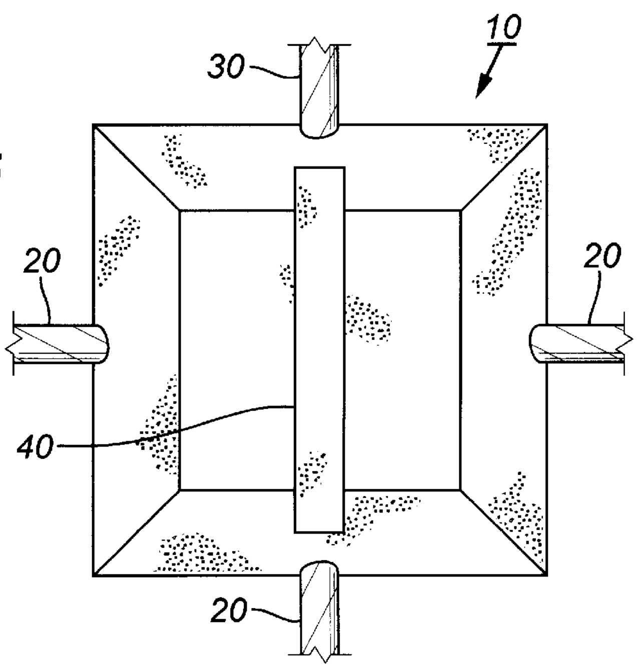
FIG. 5 is a top view of a single concrete edge element of the preferred mat used with the present invention.
Figure 6:
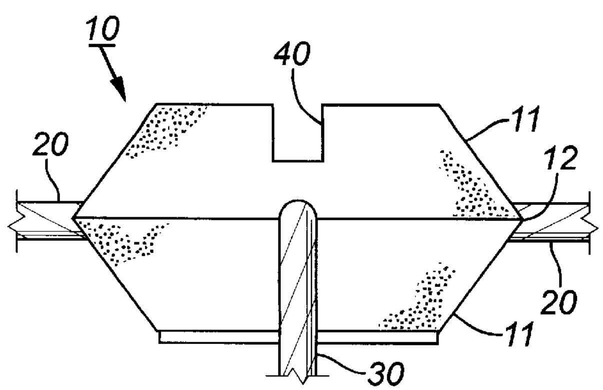
FIG. 6 is a side view of a single concrete edge element of the preferred mat used with the present invention.

The rope 20 is preferably embedded in the concrete to as to leave a small loop 30 at the exit and entrance of alternating rows and columns in the rope grid layout as shown in FIGS. 4 and 7. These small loops 30 are used to facilitate the handling and transportation of the mat 100 by the frame system 101.

Figure 8:
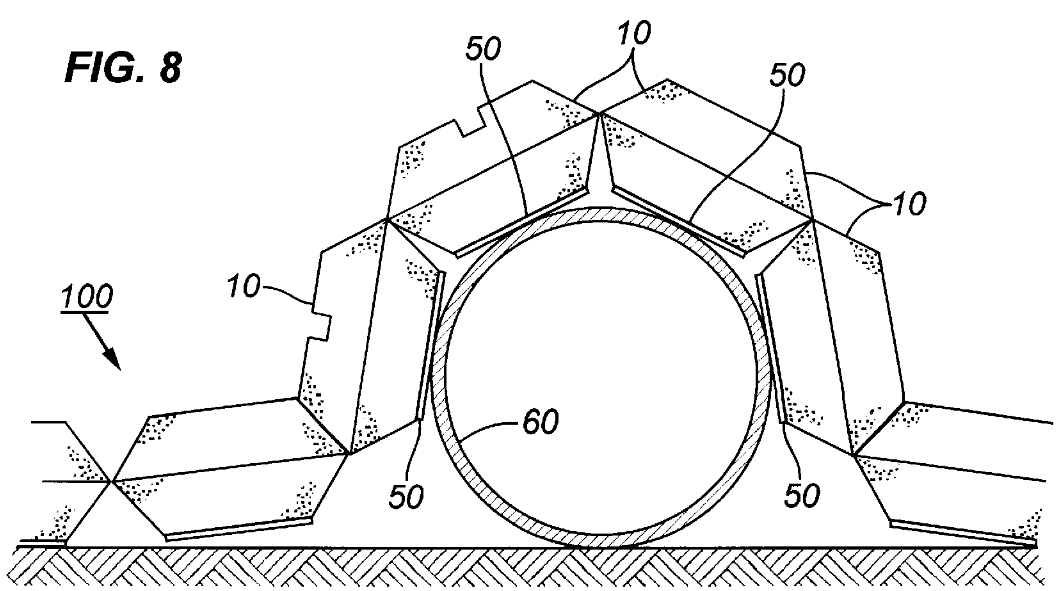
FIG. 8 is a side view of the preferred mat used with the present invention covering an underwater installation.
Figure 9:
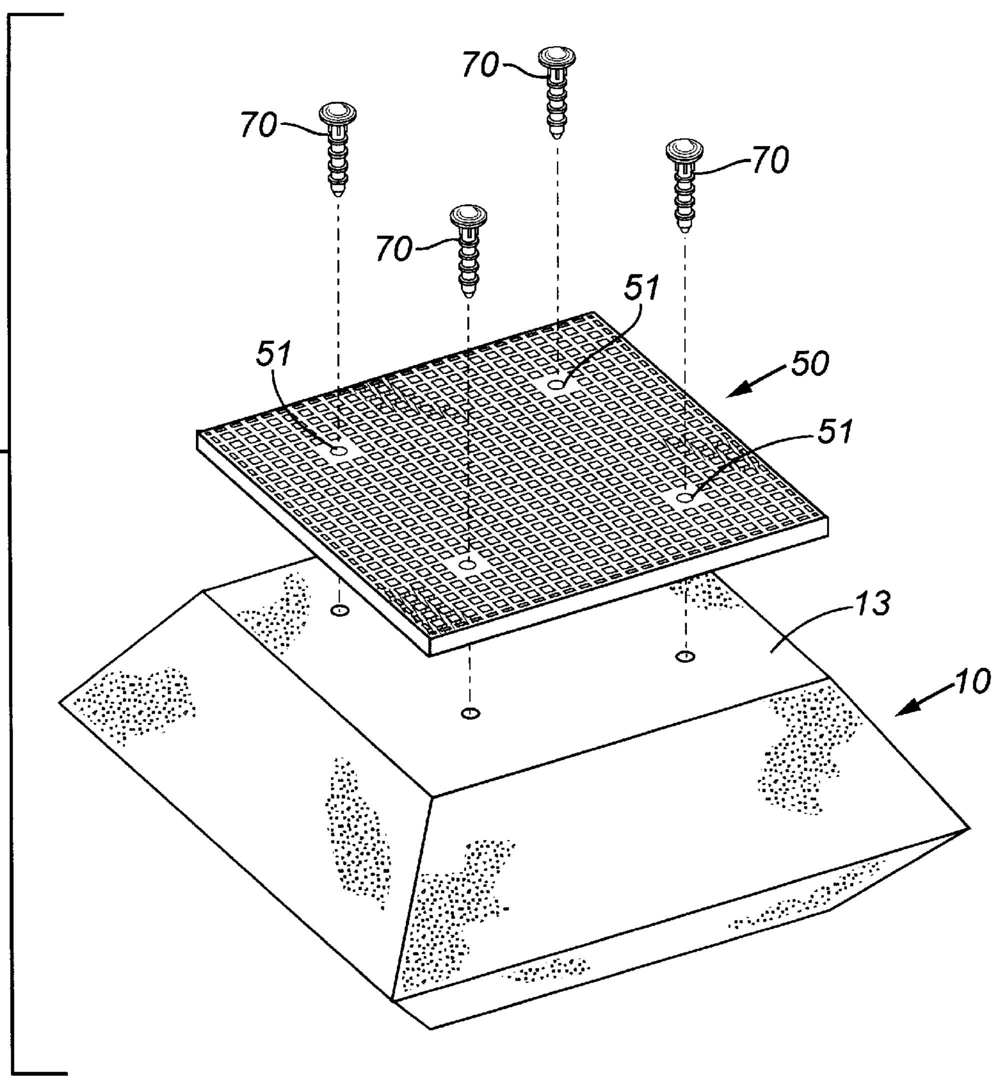
FIG. 9 is a perspective view of the assembly of the non-abrasive pad onto a single concrete element of the preferred mat used with the present invention.

As mentioned before, the purpose of the subsea mat is the protection of underwater installations and the stabilization of the seabed near the installation. However, some subsea installations are covered with a delicate protective coating which can be damaged by the surface of the concrete element 10 of the mat 100. To preserve the delicate coating of subsea installations, a non-abrasive pad 50 having cathodic protection is attached to at least one face 13 of the concrete element 10 as shown in FIG. 9. The non-abrasive pad 50 is situated between the concrete element 10 and the subsea installation 60 as shown in FIG. 8 and is constructed so as to permit ion flow through the pad to the undersea installation. In the most preferred embodiment of this invention, the mat is constructed with the non-abrasive pad affixed to it with fasteners which are embedded through the mat and into the concrete while still wet and is used with the frame system to form a subsea frame system for disposing novel protective mats with non-abrasive pads onto underwater installations thereby reducing ion flow to installations. The best material for the non-abrasive pad 50 is lowdensity polyethylene ("LDPE") although polyvinyl chloride ("PVC") and nylon also work well. Any polymer substance capable of sustaining weight for concrete elements can be used for the pad, as long as it remains flexible at temperatures which are found at least as deep as 2500 feet. As the pads 50 have no appreciable affect on the seabed, the pads 50 may be eliminated from those elements 10 which would not come in contact with the subsea installation 60. In the preferred embodiment of the mat, each of the elements 10 are fitted with a pad 50 so that any portion of the mat may be placed onto the subsea installation 60.

Figure 10:
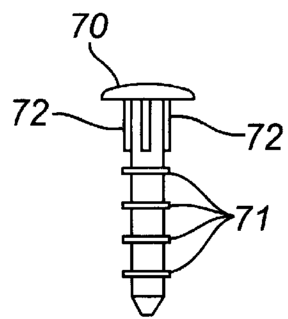
FIG. 10 is a nylon fastener used to attach a non-abrasive pad onto a concrete element of the preferred mat used with the present invention.

As shown in FIG. 9, the non-abrasive pad 50 is attached to the concrete element 10 by fasteners 70 at the hole 51 of the non-abrasive pad 50. A profile of a fastener 70 is shown in FIG. 10. Although the fasteners 70 may be placed into the element 10 by a variety of means, it is best to form the concrete element 10 around the fastener 70 to provide the most secure attachment of the non-abrasive pad 50 to the element 10.

Figure 13:
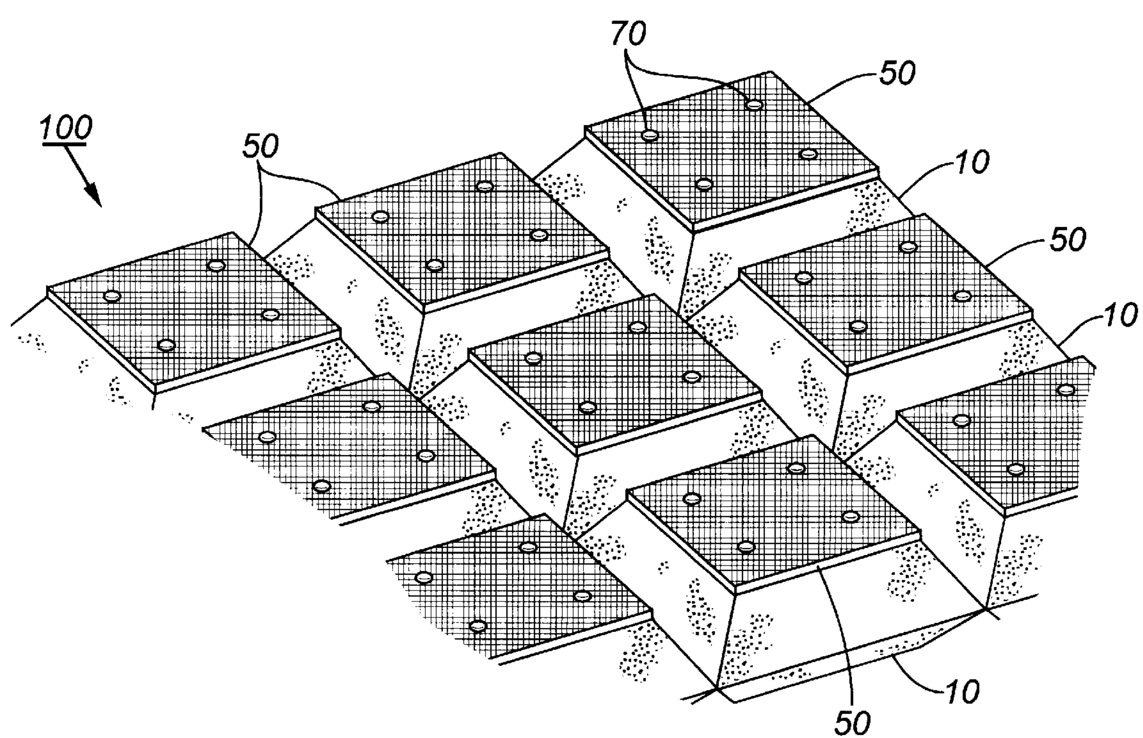
FIG. 13 is a perspective view of the subsea mat, with non-abrasive pad, of the preferred mat used with the present invention.

The best material for the fastener 70 is nylon. Suitable materials are PVC and LDPE. Once again, the fastener, like the pad, must be capable of not becoming brittle at temperatures and pressures found in at least 2500 feet of water. Other non-metallic materials can be substituted for nylon if those materials are not abrasive to the protective coating of the subsea installation and the substitute material does not deteriorate significantly in sea water or become brittle. In the most advantageous configuration, four fasteners are fitted onto each non-abrasive pad 50 and the concrete element 10 is formed around the fasteners ribs 71 of the fastener 70. In the preferred embodiment, each element 10 is fitted with a non-abrasive pad 50 on one face 13 as shown in FIG. 13.

Figure 11:
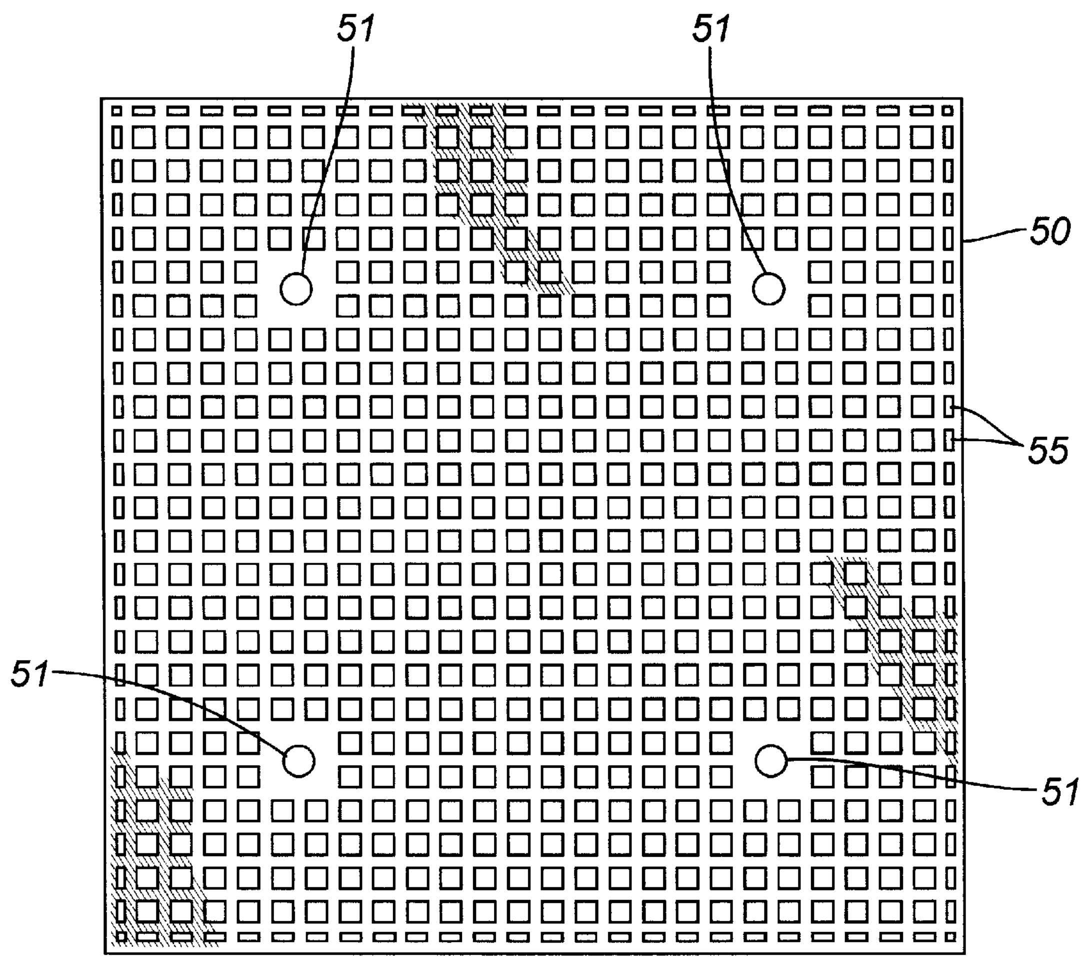
FIG. 11 is a top view of the non-abrasive pad of the preferred mat used with the present invention.
Figure 12:
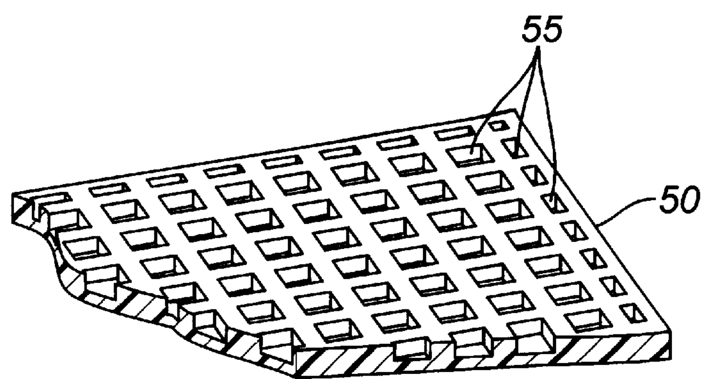
FIG. 12 is a partial perspective view of the non-abrasive pad of the preferred mat used with the present invention.

A typical non-abrasive pad 50 is shown in FIGS. 11 and 12. Pad 50 is fitted with four fastener holes 51 which allow the fastener 70 to be fitted onto the pad 50 as shown in FIG. 9. In the optimum configuration, pad 50 contains an array of openings 55 as shown in FIGS. 11 and 12. The openings 55 serve a dual function. They protect the concrete element from the thin film epoxy coated pipeline and allow the ions to flow through the non-abrasive pad to the pipeline, preventing rusting, corrosion or similar deterioration of the pipeline, and causing cathodic protection.

Figure 14:
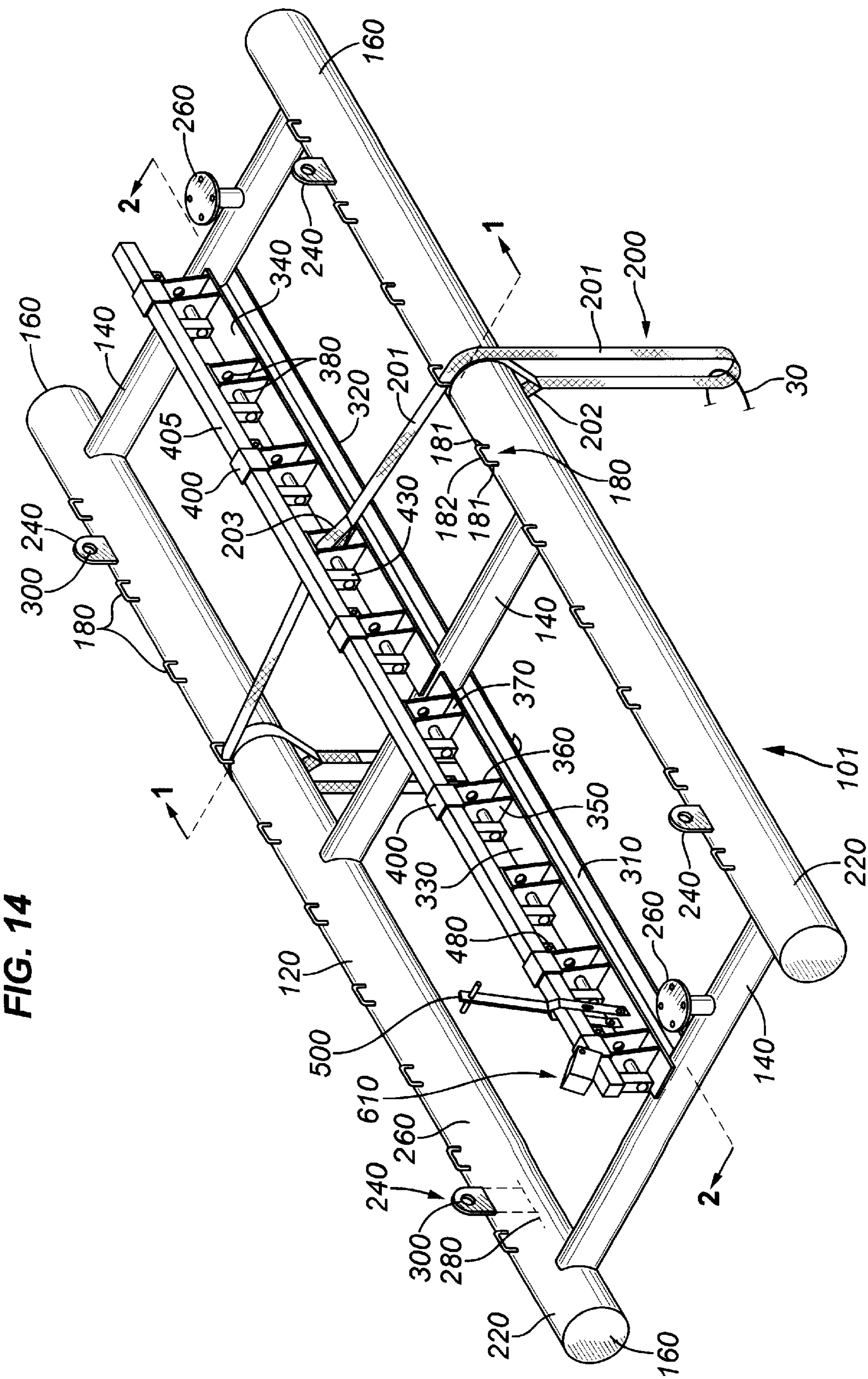
FIG. 14 is a perspective view of the preferred embodiment of the present invention shown with an illustrative single sling and with the pins supporting one loop of the sling, FIG. 14 being shown partly in phantom line and showing the release handle in a semi released position with the safety latch open.
Figure 15:
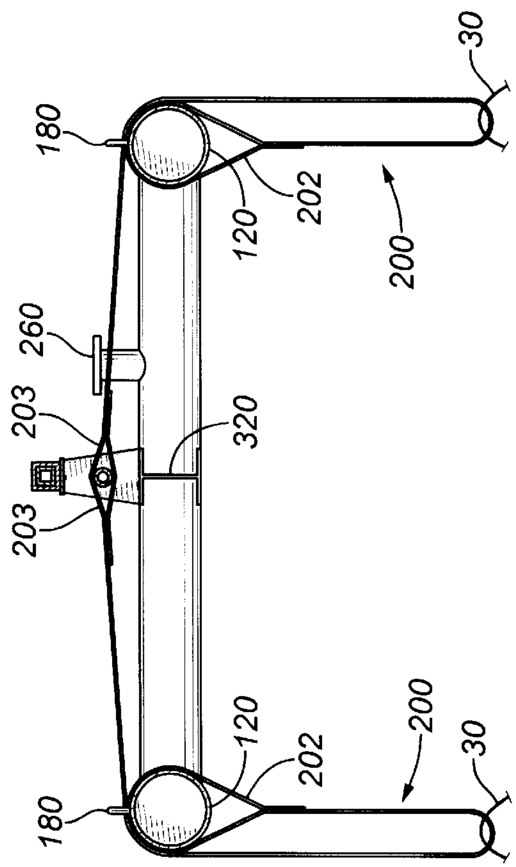
FIG. 15 is a cross sectional of the preferred embodiment of the present invention taken along section lines 1—1 of FIG. 14.

FIG. 14 shows the handling frame system of the preferred embodiment of the present invention. The frame 101 includes longitudinal hollow steel pipes 120, such as ones having an eight inch outer diameter. Hollow steel pipes 120 can be cross connected by three lateral pipes 140, such as ones having a six inch outer diameter. All of the pipes are preferable hollow, however they could be solid, provided the weight of the frame did not become so heavy as to become immovable. Pipes 120 further include end caps 160 welded to the ends 220 of pipes 120 to seal them and to provide, preferably, stability to the overall frame system 101. The frame is designed to be capable of sustaining weights and pressures in shallow water, such as 20 foot depths, or greater depths, of at least 2500 feet, and even deeper water depths and supporting mat weights which are range from 5 tons to 70 tons, depending on the mat size and frame size. Preferably, a 8×20 foot frame can hold 1 five ton mat or two five ton mats (for a total of 10 tons). An 8×40 foot frame should not bend or collapse in supporting 2 to 4 mats, up to 20 tons. An 8×60 foot frame should support 3 or 6 mats and sustain from 15 to up to 30 tons. An 8×80 foot frame should support 4–8 mats and be capable of 20–40 tons of weight. An 8×100 foot frame should support 25–50 tons and 5–10 mats. Similarly and 8×120 foot frame should support 30–60 tons and 6–12 mats, and finally an 8×140 foot mat should support 35–70 tons and 7–14 mats of concrete. Other sizes and weights could be used, but these versions are contemplated as the preferred embodiments for the frame system. The frames 101 may be, preferably, in lengths of twenty, forty, sixty, eighty, one-hundred, 120, or 140 feet and can be a variety of thickness and widths. An 8 foot frame is preferred because it can be easily trucked, however, a width of 10 feet, or a shorter width for helicopter use is contemplated. The frames need to be able to handle mats which are at least 8 feet wide, and 20 foot wide but could be larger, and capable of delivering from 1–14 mats at a time. Mounted on the upper end of pipes 120 are aligning guides 180 which are used for guiding the suspenders 200 which connect the mats to the frame. In a preferred embodiment, the aligning guides 180 have two vertical legs 181 and a horizontal leg 182, the horizontal leg 182 spaced above the surface of pipe 120 by vertical legs 181. These aligning guides could be of other shapes, and are not necessarily of the "u" design. They must simply service as a guiding device for the suspenders 200. Any number of aligning guides 180 can be used on the invention. For a frame to support 8×20 foot mats, there are preferably ten aligning guides 180 for each pipe 120. Typically aligning guides 180 are made of cold rolled round steel having a ¾ inch outer diameter. The width of the aligning guide is approximately equal to the width of a suspender, which preferably is a nylon web sling 200. The suspender extends under the horizontal member and above the upper surface of pipe 120 as it feeds through aligning guide 180. A series of aligning guides 180 are located along the upper surface of pipe 120 to accommodate a series of suspenders 200 fed through them. There are a series of suspenders 200, although only one is shown illustratively in FIG. 14. The aligning guides 180 mounted on one of the pipes 120 are mounted to correspond to aligning guides 180 mounted on the other one of the pipes 120 in approximately the same position on each pipe to receive corresponding suspenders 200.

The ends 220 of pipes 120 extend beyond the outer surfaces of the end pipes 140 to protect the support and release mechanisms for suspenders 200 and the mat 100 supported by the suspenders 200 (although not shown in FIG. 14 as being supported except to show the position of loops 30. In a preferred embodiment, the mat 100 would be supported by nylon web slings 200 fitted through loops 30 on the sides of mat 100).

The suspenders 200 are preferably web slings which are made from Webmaster® 1600 Nylon and Polyester. The webbing material can be one or two ply and is preferably made from the commercially available Type 3 and 4 material known as EE2-803 having a vertical rated capabilities in lbs of 8600, choker capacity of 6900 and a basket capacity of 17200. A variety of other materials can be used as long as the vertical rated capacity can sustain the weight of the mats, which can be as low as 6400 vertical pounds and over 9500 vertical pounds. The web straps in the preferred embodiment may be two inches wide but they can be as wide as necessary to match the frame needs for weight support. It may be possible to use webs which are 3, 4 or even 5 inches wide, perhaps wider. The suspenders 200 are typically having ends loops 202, 203 and are preferably double stitched to reduce the possibility of breakage. End loop 202 of each suspender 200 circumferentially surrounds longitudinal pipe 120. The suspender is sized to support the weight of the mats plus ocean surge. One suspender end 203 may be inserted through the other loop 202 around one of the pipes 120 and then the loose end loop 203 is fed through loop 30 and then used as set out below, finally being attached to the pin connector. The suspenders 200 may be of varying lengths along the length of pipe 120, so that in a preferred embodiment, at one end of the pipe 120, suspenders 200 are longer than at the other end of pipe 120. For example, in a preferred embodiment for a frame capable of supporting an 8×20 mat, where 10 suspenders are used on each side, the lengths of the suspenders would be 14 feet long and gradually longer, by approximately ½ foot per strap so the last strap would be 18 and ½ feet long. Optionally, the suspenders would be graduated in length so that the longer straps are in the middle of pipe 120. The purpose of the varying lengths of suspenders 200 is to permit one end of the mat 100 to touch down on the ground before the rest of the mat so that with the one end near or touching the ground, the mat may be further positioned, such as using radar or sonar or acoustic beacons on pedestals 260 as discussed below with great accuracy. Once the mat is positioned, it can be quick released as discussed below.

Also mounted on pipes 120 near ends 220 are pad eyes 240, the pad eyes 240 being mounted at opposing positions on each of pipes 120. In the preferred embodiment, pad eyes which are steel, to such as ¾ inch by six inch pad eyes 240 with two inch holes. The pad eyes 240 are welded to the upper surface of pipe 120 and extend through the hollow interior 260 of pipe 120 and are welded at the lower surface 280 of pipe 120. Pad eyes 240 are adapted to receive a cable (not shown) in each of the holes 300 which cables, preferably four of them, are used to hoist handling frame system 101 such as from a boat or helicopter. Not only may a boat with crane be used to lower the frame 101 through the use of pad eyes 240, but a remote operating vehicle may be so used to lower the frame 101 for deep water activity.

The lateral pipe 140 are welded to the sides of pipe 120, the outer lateral pipes 140 being recessed approximately the same distance from welded end caps 160 on opposite sides of pipes 120. The middle lateral pipe 140 is welded to the sides of pipes 120 approximately equally distant from the welded end caps 160 on each side of pipes 120.

Further, sonic beacon pedestals 260 are mounted on the upper surface of the end pipes 140, substantially in opposition to each other, such mounting being by welding or other suitable mechanism. The sonic beacon pedestals 260 are adapted to receive either acoustic or radar equipment used to accurately position the handling frame system 101 and thus the mat 100, over the pipeline 60. The acoustic or radar equipment is well known in the art and is not shown in FIG. 14, such as Sonar Dyne Beacon or reflective mountings.

Figure 17:
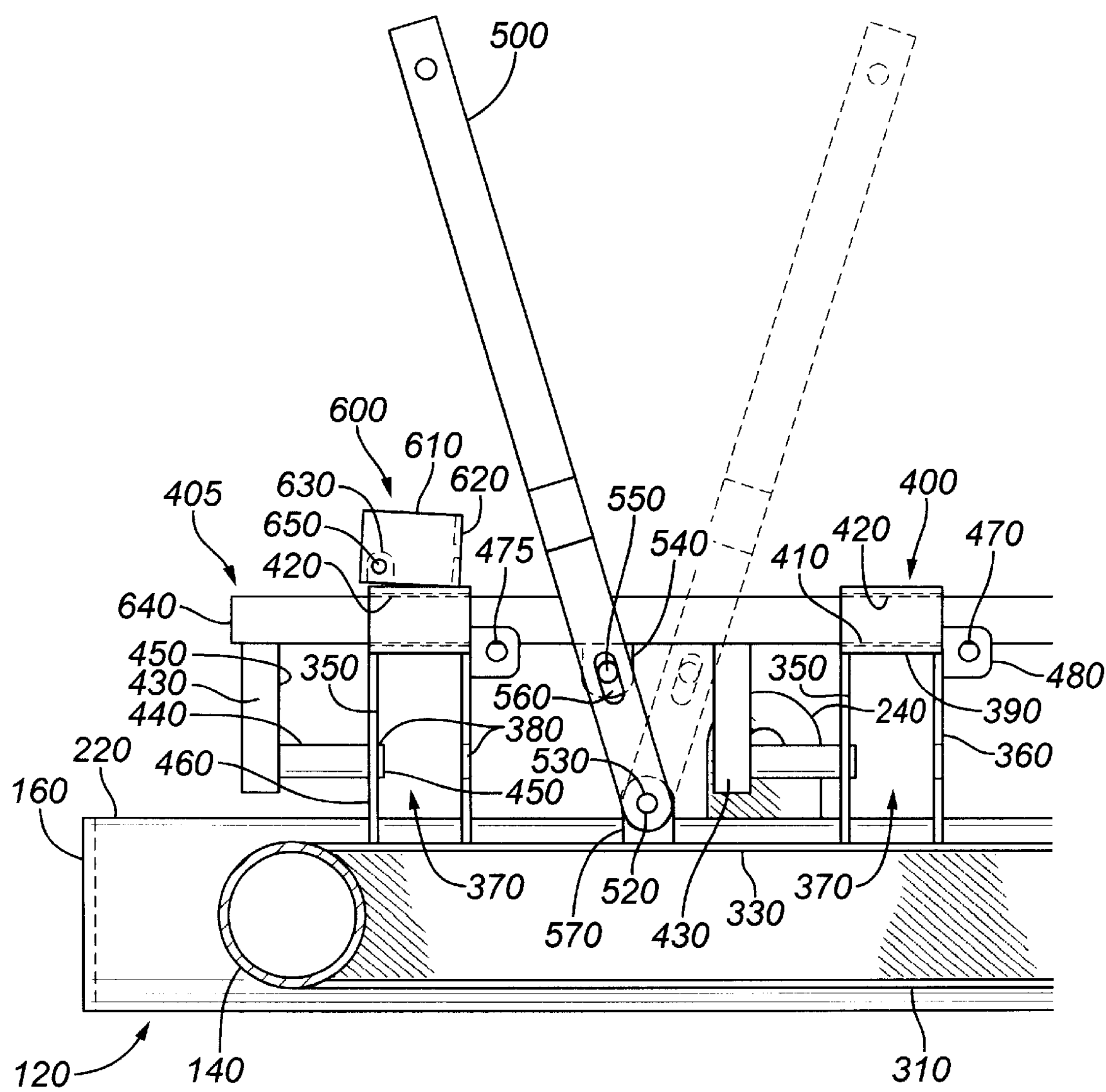
FIG. 17 is a detail to be marked as "3" of FIG. 16 of the preferred embodiment of the present invention and showing the release handle in the open position, and in phantom line in the locked position, and showing the safety latch in the unlocked position.

A first wide flange I-beam 310 is mounted approximately equally spaced from and parallel to pipes 120, extending from, and welded to, one outer lateral pipe 140 and the interior lateral pipe 140. A second wide flange I-beam 320 is similarly equally spaced from and parallel to pipes 120, extending from, and welded to the other outer lateral pipe 140 and the interior pipe 140. The wide flange I-beams 310, 320 are typically six by six conventional steel beams. Each of the I-beams 310, 320 has an upper flange 330, 340 respectively. The upper flange 330, 340 of each of I-beams 310, 320, respectively, includes parallel mounted, short, metal plates, 350, 360 traversing the width the upper flanges 330, 340, respectively, of I-beams 310, 320. The position of the channels 370 formed between sides 350, 360 along I-beams 310, 320 correspond in position to the position of aligning guides 180 along pipes 120. Each of the plates 350, 360 has an opening 380 formed approximately at its center, such that the holes 380 are coaxial with each other. Preferably, such holes for each pair 350, 360 are also coaxial with the holes for all other pairs 350, 360. Each of the pairs of plates 350, 360 has a top 390 welded to it (FIG. 17). A guide 400 is mounted on the upper surface 410 of alternating tops 390, which guide 400 may be round or square or rectangular shape or other shape, but preferably square, such as three inch by three inch by one quarter inch square welded tubing with one flat side cut off. A guide 400 may not be mounted on each pair of plates 350, 360, but only as a sufficient number to support a round or square welding tubing 405 to fit within the opening 420 (FIG. 17) of guide 400 and reciprocates within such openings 420. The tubing 405 is preferably square, such as two inch by two inch by one quarter inch square welding tubing.

Figure 16:
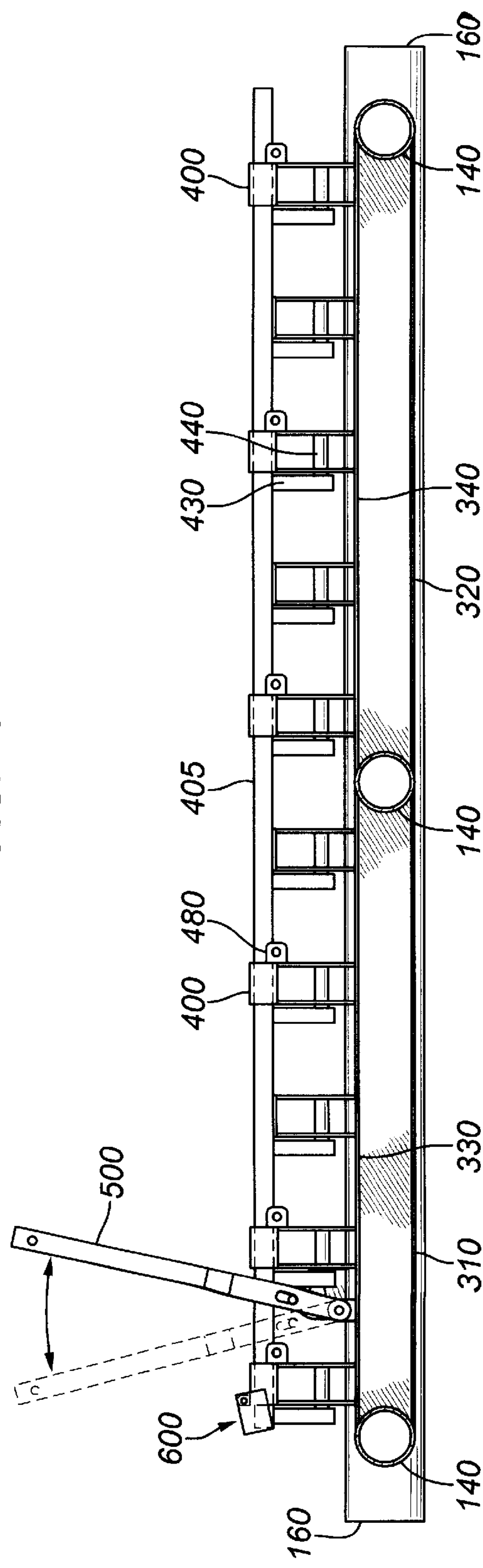
FIG. 16 is a cross sectional view of the preferred embodiment of the present invention taken along section lines 2—2 of FIG. 14 and showing the release handle in the locked position, and in phantom line in the open position, and showing the safety latch in the locked position.

Tubing 405 has a series of brackets 430 depending downward from tubing 105, there being a bracket 430 for each pair of plates 350, 360. At the lower end of each bracket 430, there is mounted by welding or other means, a taper pin 440 having a tapered 450 sized to fit within opening 380 in each of the plates 350, 360. The taper 450 helps to facilitate insertion of the pin 440 into openings 380. The taper pins 440 are preferably one and a half inch by seven and a half inch long, being sized to fit across opening or channel 370 and thus into two openings 380 when the inner face 450 of bracket 430 abuts the outer surface 460 of plate 350, as shown in FIG. 16. When the taper pins 440 are in the lock position, such as FIG. 16, they are inserted through the loops 203 of each of the opposing suspenders 200, thereby supporting the mats 100. Preferably, when the taper pin is in the unlock position (FIG. 17), the taper 450 still barely extends into opening 380, but not sufficiently so that the loops 203 are still encircling taper pin 440. The loops 203 are forced from encircling taper pin 440 in the unlock position by the side of the plate 350. The pins are loosely fit into the holes so that if rusting occurs, the mechanisms can still engage and quick release. In the open position, as in FIG. 17, the loops 203 no longer are held by taper pin 440. The loops 203 will then be loose, and the weight of the mat 100 (not shown in FIGS. 14–17) through loops 30 will cause the individual webs 200 to pull loops 203 out of openings 370 and through aligning guides 180 so that loops 30 no longer encircle, but permit the mats 100 to be released from the frame, as in FIG. 8.

The movement of square welding tubing 405 through openings 420 is facilitated by a stainless steel rolled pin 470 or other suitable rolling or bearing member which is mounted in openings 475 in brackets 480. A polyamide or other materials can be used instead of the stainless steel pin. Brackets 480 are mounted to plates 360. The rolled pins 470 and held in place by a cotter pin (not shown) or other suitable mechanism. The upper surface of rolled pin 470 is approximately co-planer with the lower surface formed by guide 400 to permit the tubing 405 to reciprocate along openings 420.

The movement of tubing 405 is controlled by a release handle 500, such as a flat bar of ⅜ inch by two inch dimension. The release handle 500 is pinned by a bracket 510 to the upper surface 330 of I-beam 310. The release handle 500 is rotatably mounted to bracket 510 through an opening 520 having a pin 530 therein that facilitates rotation of the handle 500 from an open position (FIG. 17) to a lock position (FIG. 16). The handle 500 is also attached to a bracket 540 to tubing 405, bracket 540 being welded to tubing 405. The release handle has to be large enough to accommodate the grip of an ROV (Remotely Operated Vehicle) or of a one atmosphere manned diving device, or for a diver using a tool. Alternatively, the handle could be designed to engage hydraulic means so that the handle can be quick released through remote activated means, such as infrared signaling devices or similar actuation devices. The bracket 540 attachment to handle 500 is through a pin 550 mounted bracket 540 and reciprocating in an elongated opening 560 formed in the lower end of handle 500. Thus, pin 550 will be able to follow handle 500 and through the exertion of force, through opening 560, will cause the tubing 405 to move from the open position to the lock position and from the lock position to the open position. Approximately 30 to 50 lbs of force is required to operate handle 500 which can be done either by diver or by remote operation such as a ROV.

A safety latch 600 is provided to prevent reciprocation of tubing 504 inadvertently through an inadvertent handling of release handle 500. Safety latch 600 comprises a box member having a lower opening 610 and a wall 620, the opening 610 sized to fit over tubing 405. Safety latch 600 is pivotably connected by bracket 630 to the upper end of the outer most guide 400 and is sized as in FIG. 16 to fit over the end 640 of tubing 405 when pivoted about its axis of rotation 650 when the tubing 405 is in the lock position.

As shown in the preferred embodiment, the handle 500 is mechanically manipulated. The handle 500 may also be manipulated by hydraulic or pneumatic control or other suitable mechanism that is responsive such as acoustic activation. Further, the frame is usually coated to prevent rusting, preferably with an epoxy paint. In addition, the tubular locking mechanism could be of any sort, but the square locking mechanism is considered to be preferable for strength and for sloppiness to accommodate rust in the lock.

In operation, wire (not shown) can be deployed through the pad eyes 240 is used to position frame 101 over the pipeline 60 through the use of radar, sonar, or acoustic beacons. The radar, sonar or acoustic beacons are known in the art for positioning. After initial positioning, the pad eyes 240 and their cables are used to lower the frame until the longest suspenders 200 are in close proximity or touch the pipeline 60. Thereafter, the frame 101 is further positioned for accuracy and then the safety latch 610 is opened after which release handle 500 is operated, thereby releasing loops 203 from around taper pin 440 as it exits through opening 380 so that the loops 203 fall off their position thereby permitting loops 30 to be released from suspenders 200 so that mat 100 will be positioned over pipe 60.

Although the present invention is described and illustrated above with detailed reference to the preferred embodiment, the invention is not limited to the details of such embodiment but is capable of numerous modifications, by one of ordinary skill in the art, within the scope of the following claims.

We claim:

1. A handling frame system to place and release concrete mats, comprising a frame having a plurality of support means for supporting a mat;

guidance means mounted on said frame for guiding said frame to the placement position for the mat;

quick release means for substantially simultaneously releasing said plurality of support means from supporting the mat.

2. A method for placing and releasing concrete mats, comprising:

supporting the mats by a frame;

guiding the mats on the frame to a placement position for the mats;

quick release for substantially simultaneously releasing the mat from the frame after the mat has reached the placement position.

3. The method of claim 2, wherein there is further included the step of preventing the quick release means from operating prior to the frame being in the placement position.

4. The method of claim 2, wherein the step of supporting the mat is done by a plurality of supports on the frame and the quick release step includes substantially simultaneously releasing the plurality of supports to release the mat.

5. The method of claim 2, wherein there is further included the step prior to quickly releasing the mats of lowering the mats to the approximate placement position.

* * * * *